STEREOPHONIC DECODERS FOR F.M. RECEIVERS

Filed Oct. 10, 1966

INVENTOR.
ROLAND H. FICHTNER
BY
PATENT AGENT 3,372,238
STEREOPHONIC DECODERS FOR F.M. RECEIVERS

Roland H. Fichtner, Waterloo, Ontario, Canada, assignor to Dominion Electrohome Industries Limited, Kitchener, Ontario, Canada Filed Oct. 10, 1966, Ser. No. 585,660
6 Claims. (Cl. 179—15)

ABSTRACT OF THE DISCLOSURE

"Motorboating" of an F.M. receiver adapted to reproduce both monaural and stereophonic signals is avoided by means of a single transistor connected to the tuned circuit of the frequency doubler of the stereophonic decoder and a D.C. feedback path between this transistor and the doubler transistor that varies the base-emitter D.C. bias of the doubler transistor and increases its collector current in response to an increase in the collector current of the former transistor, whereby a stronger signal is required to switch the decoder from the monaural to the stereophonic operating condition than the signal required to switch the decoder from the stereophonic to the monaural operating condition.

This invention relates to F.M. receivers. More specifically, this invention relates to stereophonic decoders for F.M. receivers.

In accordance with regulations currently prescribed by the F.C.C. in the United States and D.O.T. in Canada, the composite signal for use in F.M. multiplex transmission must have the following mathematical form, $$M(t)=(L+R)+(L-R)\cos \omega t+P\cos \frac{\omega}{2}t$$

where $M(t)$ is the composite signal

L is the left channel audio signal
R is the right channel audio signal
P is the pilot carrier amplitude
$\omega=2\pi f$, $f$ presently being 38 kHz.

In the foregoing equation, $(L+R)$ is the sum of the left and right audio channel signals and, therefore, is called the monophonic signal. An F.M. receiver which is not equipped to reproduce stereophonic signals will reproduce the $(L+R)$ signal only. $(L-R)\cos \omega t$ represents the difference between the left and right audio channel signals amplitude modulated onto a 38 kHz. carrier which is suppressed prior to transmission of the composite signal.

$$P\cos \frac{\omega}{2}t \text{ is a 19 kHz. pilot carrier}$$

It will be noted that the amplitude modulated carrier (38 kHz.) is harmonically related to the pilot carrier (19 kHz.), the frequency of the latter being exactly one half of the frequency of the former. In addition, the amplitude modulated carrier and the pilot carrier are in phase. The pilot carrier is a necessary part of the composite signal, since it serves the function of reintroducing the suppressed 38 kHz. carrier into the composite signal in the F.M. multiplex receiver. It can be said that the pilot carrier is a synchronization signal for the correct decoding of the composite signal at the receiver.

In addition to the foregoing components, the composite signal may contain an S.C.A. signal for store casting or subscription music transmission, the use of this signal by the broadcaster being optional. The bandwidth of the S.C.A. channel presently is 67±7 kHz.

The monophonic signal can frequency modulate the

F.M. broadcast carrier up to 80%, if S.C.A. is present, or up to 90% with no S.C.A., of the maximum modulation (±75 kHz.) permitted by the F.F.C. and D.O.T. regulations. The stereophonic signal also can modulate up to 80% with both side bands, or 40% with each side band, of the maximum modulation if S.C.A. is present, these figures being 90% and 45% respectively with no S.C.A. The pilot carrier modulates up to 10% i.e. ±7.5 kHz. assuming 100% modulation to be ±75 kHz. Thus, for F.M. multiplex transmission present regulations require an RF signal which may be modulated by the following signals in the noted frequency bands:

$L+R$ from 0 to 15 kHz.
$L-R$ in the form of ±(0 to 15) kHz. sidebands of 38 kHz. sub-carrier with carrier suppressed and in the band 23 to 53 kHz.
A pilot carrier at 19 kHz.
A subsidiary carrier (S.C.A.) having a bandwidth from 60 to 74 kHz.

In an F.M. multiplex receiver a decoder must be provided to derive the audio L and R signals and separate them from each other for individual reproduction. In a conventional F.M. receiver adapted to reproduce both monaural and stereo signals, it is common practice to provide for automatic switching, i.e., when a stereo signal with its 19 kHz. pilot carrier is being received and is of a predetermined minimum strength, the stereo decoder of the receiver will switch automatically from a monaural operating condition to a stereophonic operating condition, and when the 19 kHz. pilot carrier is absent from the signal being received, the decoder will revert automatically to its monaural operating condition.

It is very desirable that a stronger signal should be required to effect the switching from the monaural operating condition to the stereo operating condition than would be required for switching from the stereo operating condition to the monaural operating condition. This will prevent what is known as "motorboating," such as would otherwise occur if the signal strength were just above the level required to effect switching from the monaural operating condition to the stereo operating condition and from time to time varied in strength to just below the switching level.

In the past "motorboating" has been prevented by the use of a Schmitt trigger circuit (a bistable multivibrator using two transistors). The Schmitt trigger circuit is driven by the current from a frequency doubler, this current being indicative of the pilot carrier level of the incoming signal. The output signal from the trigger circuit is used to light an indicator lamp for stereo operation, and it may be used to D.C. bias the diodes of a balanced diode switch for monaural operation.

In accordance with this invention there is provided a circuit arrangement which prevents "motorboating," but in which one of the transistors of the trigger circuit also is incorporated in the frequency doubler circuit, thereby reducing transistor requirements from three to two.

In a circuit embodying this invention there is a frequency multiplier that includes an input circuit, an output circuit and a transistor biased for class C operation. The input circuit includes a parallel tuned circuit, tuned to the frequency of the pilot carrier, while the output circuit includes a parallel tuned circuit tuned to the frequency of the suppressed carrier. A second transistor is connected in the collector current path of the first transistor, and a feedback network from the second to the first transistor is provided by virtue of which an avalanche effect results when the first transistor is turned on.

This invention will become more apparent from the following detailed description, taken in conjunction with the appended drawings, in which.

Figure 1:
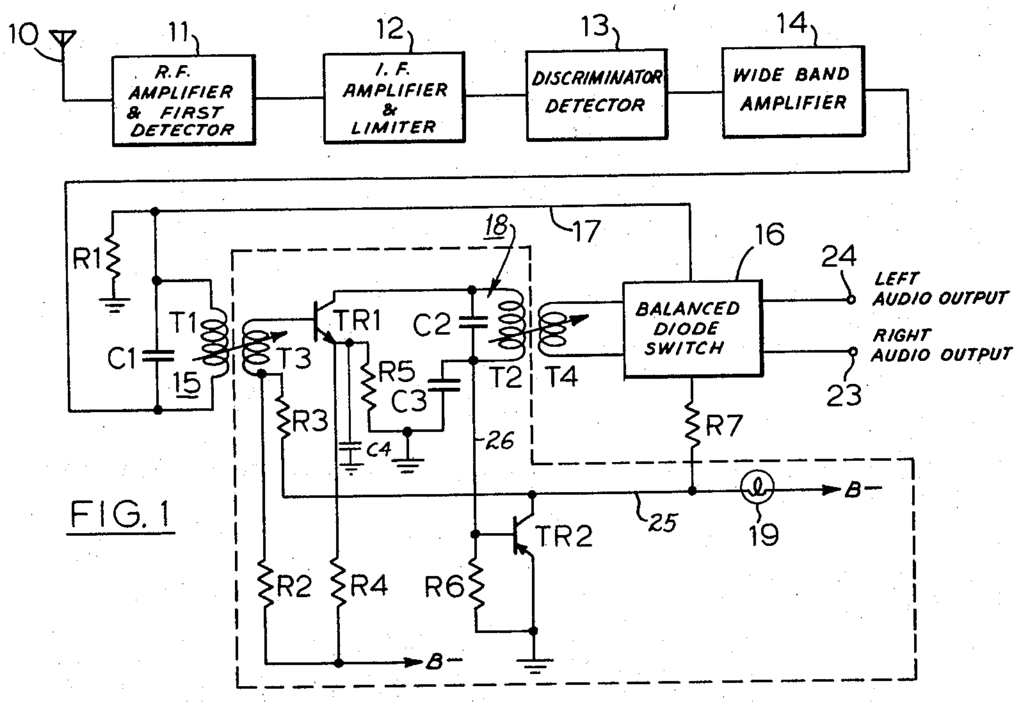
FIGURE 1 shows a part of an F.M. radio receiver that includes a stereo decoder embodying this invention.

Referring to FIGURE 1, F.M. signals are received by an antenna 10 and are amplified and detected by a conventional RF amplifier and first detector 11. The detected signal is amplified and limited by a conventional IF amplifier and limiter 12, and the composite signal representing the modulation of the received signal then is detected by a conventional discriminator detector 13. This signal is amplified by a wide band amplifier 14 and applied to a stereo decoder embodying this invention.

As shown in FIGURE 1, the signal from amplifier 14, which has a high output impedance, is applied to one terminal of a parallel tuned network 15 tuned to the frequency of the pilot carrier (19 kHz. in accordance with present F.C.C. and D.O.T. regulations) of the composite F.M. signal received by antenna 10. Tuned circuit 15 consists of the primary winding T1 of a transformer and a capacitor C1 connected in parallel with primary winding T1. The other terminal of tuned circuit 15 is connected via a resistor R1 to ground as well as to a balanced diode switch 16, this latter connection being via a conductor marked 17 and being the means whereby the signal from amplifier 14 is applied to diode switch 16. Balanced diode switch 16 may be of any known type. It may, for example, be of the type shown and described in U.S. Patent No. 3,315,037, issued Apr. 18, 1967, for Stereophonic Decoder for Frequency Modulated Signals, assigned to the same assignee as this invention.

A transistor TR1 connected in common emitter configuration and operating in class C constitutes the active element of a frequency doubler network. In the output circuit of this frequency doubler there is a parallel tuned circuit 18 which is tuned to 38 kHz., i.e. to the frequency of the suppressed carrier or twice the frequency of the pilot carrier. Tuned circuit 18 consists of the primary winding T2 of a transformer and a capacitor C2 that is connected in parallel with winding T2. One terminal of tuned circuit 18 is connected to the collector electrode of transistor TR1. A bypass capacitor C3 is connected between the other terminal of tuned circuit 18 and ground. A phase shift capacitor C4 is connected between the emitter electrode of transistor TR1 and ground and is used to establish the 0° phase shift relationship between the 38 kHz. carrier and the pilot carrier. Bias resistor R2, R3, R4 and R5 for transistor TR1 are provided. Bias resistor R2 is connected between the negative terminal of a D.C. power supply (B−) and one terminal of the secondary winding T3 of the transformer constituted by windings T1 and T3, the other terminal of winding T3 being directly connected to the base electrode of transistor TR1. Resistor R3 has one of its terminals connected to the common terminal of resistor R2 and winding T3, while the other terminal of resistor R3 is connected via a conductor 25 to one terminal of an indicator lamp 19, the other terminal of which is connected to B− or some other source of negative D.C. potential. Resistor R4 is connected between B− and the emitter electrode of transistor TR1, while resistor R5 is connected between the emitter electrode of transistor TR1 and ground.

A transistor TR2 has its collector electrode connected to conductor 25. The base electrode of transistor TR2 is connected in the collector current path of transistor TR1 by means of a conductor 26 that is connected between the base electrode of transistor TR2 and the terminal of tuned circuit 18 to which capacitor C3 also is connected. A resistor R6 is connected between the base electrode of transistor TR2 and ground to provide a path for leakage current. The emitter electrode of transistor TR2 is grounded.

The secondary winding T4 of the transformer of which T2 is the primary winding is connected to balanced diode switch 16 so that a switching voltage may be applied to the balanced diode switch 16 when the receiver is receiving a composite signal that is of a minimum predetermined strength and that includes a 19 kHz. pilot carrier.

Figure 2:
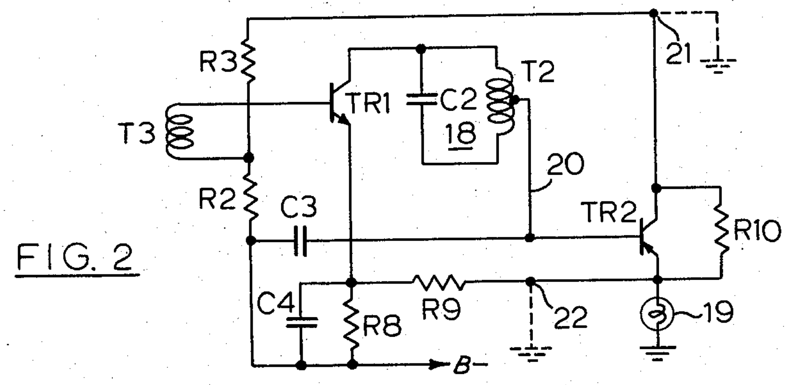
FIGURE 2 shows three alternative embodiments of the circuit within the dashed line of FIGURE 1.

In FIGURE 2 the same components as are present in FIGURE 1 have been given the same reference numerals and letters. In the circuit of FIGURE 2, a centre tap on winding T2 is connected to the base electrode of transistor TR2, and resistor R6 has been omitted, since transistor TR2 is a silicon transistor in the circuit of FIGURE 2, whereas it is a germanium transistor in the circuit of FIGURE 1. A resistor R10 to limit the collector-emitter voltage of transistor TR2 for breakdown is connected between the collector and emitter electrodes of this transistor. The emitter electrode of transistor TR2 is connected through lamp 19 to ground, and it also is connected to B− via series connected resistors R9 and R8, the latter having capacitor C4 connected in parallel therewith. Bypass capacitor C3 is connected between B− and the centre tap of winding T2. The collector electrode of transistor TR2 is connected via series connected resistor R3 and R2 to B−. Winding T3 is connected between the base electrode of transistor TR1 and the common terminal of resistors R2 and R3.

In another possible embodiment of the invention also shown in FIGURE 2, the point designated 21 may be grounded. In still another embodiment, the point designated 22 could be grounded and the connection between this point and the emitter electrode of transistor TR2 broken.

The operation of the circuit of FIGURE 1 now will be described. If no 19 kHz. pilot carrier is present in the signal being received, transistor TR1 will be cut off, i.e., will be biased off via resistors R2, R3, R4 and R5. Consequently, there will be no current flowing in the collector circuit of transistor TR1, so that no voltage will be developed across resistor R6, whereby transistor TR2 will remain in the cut off condition. While transistor TR2 is cut off, the voltage at its collector electrode will be at B−. Under these circumstances, the stereo decoder is in its monaural operating condition.

When a signal of a minimum predetermined strength and which includes a 10 kHz. pilot carrier is being received, the positive peaks of the voltage developed across winding T3 will drive transistor TR1 into conduction, and a 38 kHz. switching voltage will be developed across winding T2. This switching voltage will be applied to diode switch 16 via secondary winding T4 and its connections to the diode switch. Collector current pulses will flow in the collector circuit of transistor TR1. These pulses will be filtered by capacitor C3, and a D.C. voltage will be developed across resistor R6. As this D.C. voltage develops, transistor TR2 will begin to turn on, and the voltage at its collector electrode will vary in a positive direction towards ground potential. By voltage divider action via the voltage divider consisting of resistor R3 and R2, the voltage applied to the base electrode of transistor TR1 will become more positive. This will have the effect of increasing the collector current of transistor TR1. This, in turn, will cause transistor TR2 to be turned on more fully, so that an avalanche effect will result, and transistor TR2 quickly will become saturated. When transistor TR2 becomes saturated, the voltage drop across it will become very small, so that a substantial current will flow from ground through TR2 and lamp 19 to B−. This current will light lamp 19 indicating that the stereo decoder has switched from its monaural operating condition to its stereo operating condition. Diode switch 16 will be driven by the 38 kHz. switching voltage from winding T4, thereby resulting in proper decoding of the stereo signal with the left audio signal being supplied to terminal 24 and the right audio signal being supplied to terminal 23. It will be understood that these signals may be further amplified, if necessary, and then applied to loudspeakers or other sound reproducing devices.

Should the signal being received now drop slightly below the minimum level required to effect switching from the monaural to the stereo operating condition, switching from the stereo operating condition to the monaural operating condition will not result because of the bias applied to the base electrode of transistor TR1 previously having been increased. If the signal strength drops appreciably below this minimum level, however, the current passing through transistor TR2 will decrease, the voltage across lamp 19 will decrease, the voltage at the collector electrode of transistor TR2 and, to a lesser extent, at the common terminal of resistors R2 and R3 will go more negative, and, eventually, transistors TR1 and TR2 will be cut off, so that the monaural operating condition will be restored. The values of resistors R2 and R3 determine the minimum signal level required to prevent switching from the stereo operating condition to the monaural operating condition when a composite signal having a 19 kHz. pilot carrier is being received. The basic sensitivity of the circuit is determined by the values of resistors R4 and R5.

It will be appreciated, of course, that should the signal being received change from a signal with a 19 kHz. pilot carrier to a signal without such a pilot carrier, the decoder will switch automatically to its monaural operating condition regardless of signal strength.

With reference now to FIGURE 2, if there is no 19 kHz. pilot carrier in the signal being received, no current will flow in the collector current path of transistor TR1, so transistor TR2 will be cut off. With transistor TR2 cut off, a small current insufficient to light lamp 19 will flow through the lamp and then via two parallel paths to B—, one path being constituted by resistors R10, R3 and R2, and the other consisting of resistors R9 and R8.

When a stereo signal of sufficient strength is being received, however, transistor TR1 will start to conduct on the peaks of the 19 kHz. voltage developed across coil T3, a 38 kHz. switching voltage will be developed across winding T2, current pulses will flow in the collector current path of transistor TR1, which are filtered by capacitor C3, so that a D.C. current will be applied to the base of transistor TR2, and transistor TR2 will be turned on. When transistor TR2 turns on, the impedance of transistor TR2 in parallel with resistor R10 will decrease, so that more current will flow through resistors R3 and R2, and the voltage at their common terminal, i.e., the voltage applied to the base electrode of transistor TR1, will become more positive. Transistor TR1 then will draw more current, as will transistor TR2, whereby the same avalanche effect as noted previously in connection with the operation of the circuit of FIGURE 1 will result. In the circuit of FIGURE 2 this effect is enhanced, however, since, when transistor TR2 turns on, the voltage at the common terminal of resistors R8 and R9, i.e., the voltage applied to the emitter electrode of transistor TR1, will become more negative, because the voltage drop across lamp 19 will be greater when transistor TR2 is on than when it is cut off. As in the case of the circuit of FIGURE 1, transistor TR2 will saturate quickly, and lamp 19 will light. Because the base-emitter bias of transistor TR1 has been increased, a slight drop in signal level below that which is required to cause switching from the monaural operating condition to the stereo operating condition will not cause switching in the reverse direction, so that "motorboating" will be avoided.

Figure 3:
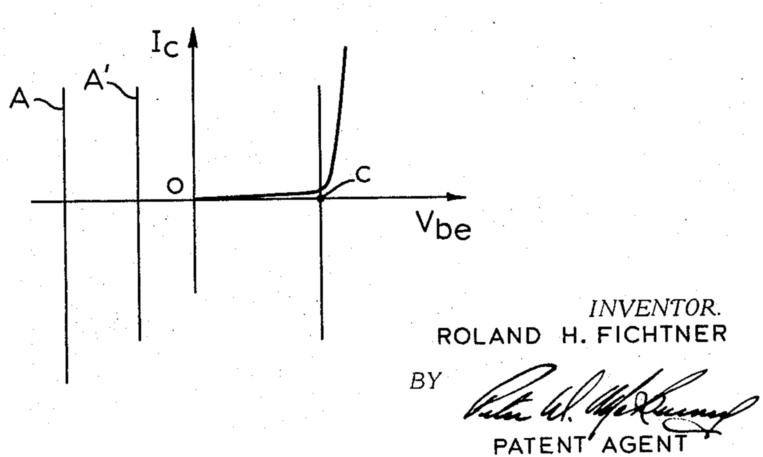
FIGURE 3 shows the *Ic* versus *Vbe* characteristic of one of the two transistors in the circuits of FIGURES 1 and 2.

In FIGURE 3 there is shown the $I_c$ versus $V_{be}$ characteristic of transistor TR1 of either FIGURE 1 or FIGURE 2. The line A designates the base-emitter bias voltage of this transistor when no signal is being received. The line A′ designates the base-emitter bias voltage of transistor TR1 after transistor TR2 has saturated. Point C indicates the turn on voltage of transistor TR1. In both the circuits of FIGURES 1 and 2 transistor TR1 operates in class C. In order for transistor TR1 to draw current, it is necessary for a signal to be applied to its base electrode having a peak to peak amplitude greater than 2(C–A). However, because of the shift in bias from A to A′ which occurs when transistor TR2 turns on, the signal strength can drop in level to a peak to peak amplitude of only 2(C–A′) before transistor TR1 will draw no more current, and, obviously, 2(C–A) is considerably larger than 2(C–A′). As mentioned previously, the values of resistors R2 and R3 determine the location of A′.

It will be apparent from a consideration of FIGURE 3 that the magnitude of bias voltage A determines the minimum signal that will cause transistors TR1 and TR2 to turn on. This bias voltage can be adjusted so that low level and hence noisy signals will not turn on transistor TR1. By proper choice of bias voltage A and resistors R2 and R3, "clean" switching in both directions can be accomplished readily.

In the modified circuit of FIGURE 2 wherein point 22 is grounded and the connection between it and lamp 19 is broken, the potential at the common terminal of resistors R8 and R9 will remain the same regardless of whether transistor TR2 is turned on or cut off. Therefore, only the change in the potential applied to the base electrode of transistor TR1 when transistor TR2 is turned on is used for the avalanche effect.

On the other hand, if point 21 is grounded, the bias on the base electrode of transistor TR1 will remain the same, regardless of the state of transistor TR2, and the avalanche effect will be created solely by the potential at the common terminal of resistors R8 and R9 becoming more negative when transistor TR2 is turned on.

In the circuits of FIGURES 1 and 2 transistor TR1 is the active element of a frequency doubler network. A part of this network is constituted by a circuit 18 tuned to the frequency (38 kHz.) of the suppressed carrier. While present F.C.C. and D.O.T. specifications make the use of a frequency doubler necessary, it will be appreciated that should these regulations change, a frequency quadrupler, for example, might be required. Also, this invention can be readily employed with certain bridge detection networks where a multiple frequency of the 38 kHz. carrier is used. In this case too, transistor TR1 could operate as frequency quadrupler.

While preferred embodiments of this invention have been disclosed herein, those skilled in the art will appreciate that changes and modifications may be made therein without departing from the spirt and scope of this invention as defined in the appended claims.

What I claim is:

1. In an F.M. receiver adapted to receive a composite signal containing a monophonic signal $(L+R)$, a pilot carrier and the sideband frequencies of a carrier suppressed carrier amplitude modulated by an $L-R$ signal, said suppressed carrier being of a frequency harmonically related to the frequency of said pilot carrier, and to separate L and R audio frequency signals from said composite signal, a decoder adapted to switch automatically from a monaural operating condition to a stereophonic operating condition when a signal containing said pilot carrier and of a minimum predetermined strength is being supplied thereto and also adapted to switch automatically from said stereophonic operating condition to said monaural operating condition when a signal containing said pilot carrier and of a strength lower than said minimum predetermined strength is being supplied thereto, said decoder also being adapted to switch automatically from said stereophonic operating condition to said monaural operating condition when a signal that is without said pilot carrier is being supplied thereto, said decoder comprising a frequency multiplier network for producing a switching voltage at a frequency corresponding to an integral multiple of the frequency of said pilot carrier; said frequency multiplier including an input circuit, an output circuit, and a first transistor having base, collector and emitter electrodes and biased for class C operation; said input circuit including a first tuned circuit tuned to the frequency of said pilot carrier and means coupling said first tuned circuit to said base electrode of said first transistor to supply a signal at the frequency of said pilot carrier to said base electrode of said first transistor when a signal containing said pilot carrier is supplied to said first tuned circuit; said output circuit including a second tuned circuit tuned to the frequency of said switching voltage and means connecting said collector electrode of said first transistor to said second tuned circuit to supply collector current pulses from said collector electrode of said first transistor to said second tuned circuit; a second transistor having base, collector and emitter electrodes; means including a D.C. connection connecting said second tuned circuit and said base electrode of said second transistor to provide a variable D.C. bias for said second transistor which increases the collector current of said second transistor with increases in the collector current of said first transistor; and means providing a D.C. feedback path between said second and first transistors for varying the base-emitter D.C. bias of said first transistor to increase the collector current of said first transistor in response to increase in the collector current of said second transistor, said means providing said D.C. feedback path comprising a first resistor connected in a circuit between said collector electrode of said second transistor and said base electrode of said first transistor and a second resistor connected in voltage divider relationship with said first resistor; D.C. power supply means and an indicator lamp, said indicator lamp being connected in a circuit between said D.C. power supply means and said second transistor, whereby when said second transistor is turned on sufficient current passes through said lamp to light said lamp, said indicator lamp being connected between said collector electrode of said second transistor and said D.C. power supply means, said second transistor being connected in common emitter configuration, said second resistor being connected in a circuit between said D.C. power supply means and said base electrode of said first transistor; a fifth resistor connected in a circuit between said D.C. power supply means and said emitter electrode of said first transistor, a terminal at a reference potential, and a sixth resistor connected in a circuit between said emitter electrode of said first transistor and said terminal.

2. In an F.M. receiver adapted to receive a composite signal containing a monophonic signal $(L+R)$, a pilot carrier and the sideband frequencies of a carrier suppressed carrier amplitude modulated by an $L-R$ signal, said suppressed carrier being of a frequency harmonically related to the frequency of said pilot carrier, and to separate L and R audio frequency signals from said composite signal, a decoder adapted to switch automatically from a monaural operating condition to a stereophonic operating condition when a signal containing said pilot carrier and of a minimum predetermined strength is being supplied thereto and also adapted to switch automatically from said stereophonic operating condition to said monaural operating condition when a signal containing said pilot carrier and of a strength lower than said minimum predetermined strength is being supplied thereto, said decoder also being adapted to switch automatically from said stereophonic operating condition to said monaural operating condition when a signal that is without said pilot carrier is being supplied thereto, said decoder comprising a frequency multiplier network for producing a switching voltage at a frequency corresponding to an integral multiple of the frequency of said suppressed carrier; said frequency multiplier including an input circuit, an output circuit, and a first transistor having base, collector and emitter electrodes and biased for class C operation; said input circuit including a first tuned circuit tuned to the frequency of said pilot carrier and means coupling said first tuned circuit to said base electrode of said first transistor to supply a signal at the frequency of said pilot carrier to said base electrode of said first transistor when a signal containing said pilot carrier is supplied to said first tuned circuit; said output circuit including a second tuned circuit tuned to the frequency of said switching voltage and means connecting said collector electrode of said first transistor to said second tuned circuit to supply collector current pulses from said collector electrode of said first transistor to said second tuned circuit; a second transistor having base, collecto and emitter electrodes; means including a D.C. connection connecting said second tuned circuit and said base electrode of said second transistor to provide a variable D.C. bias for said second transistor which increases the collector current of said second transistor with increases in the collector current of said first transistor; and means providing a D.C. feedback path between said second and first transistors for varying the base-emitter D.C. bias of said first transistor to increase the collector current of said first transistor in response to increases in the collector current of said second transistor, said means providing said D.C. feedback path comprising a third resistor connected in a circuit between said emitter electrodes of said first and second transistors and a fourth resistor connected in voltage divider relationship with said third resistor; a terminal at a reference potential; and a D.C. impedance connected between said terminal and said emitter electrode of said second transistor, said third resistor being connected in voltage divider relationship with said D.C. impedance.

3. The invention according to claim 2 wherein said D.C. impedance is an indicator lamp.

4. The invention according to claim 2 wherein said means providing said D.C. feedback path also include a first resistor connected in a circuit between said collector electrode of said second transistor and said base electrode of said first transistor and a second resistor connected in voltage divider relationship with said first resistor.

5. In an F.M. receiver adapted to receive a composite signal containing a monophonic signal $(L+R)$, a pilot carrier and the sideband frequencies of a carrier suppressed carrier amplitude modulated by an $L-R$ signal, said suppressed carrier being of a frequency harmonically related to the frequency of said pilot carrier, and to separate L and R audio frequency signals from said composite signal, a decoder adapted to switch automatically from a monaural operating condition to a stereophonic operating condition when a signal containing said pilot carrier and of a minimum predetermined strength is being supplied thereto and also adapted to switch automatically from said stereophonic operating condition to said monaural operating condition when a signal containing said pilot carrier and of a strength lower than said minimum predetermined strength is being supplied thereto, said decoder also being adapted to switch automatically from said stereophonic operating condition to said monaural operating condition when a signal that is without said pilot carrier is being supplied thereto, said decoder comprising a frequency multiplier network for producing a switching voltage at a frequency corresponding to an integral multiple of the frequency of said suppressed carrier; said frequency multiplier including an input circuit, an output circuit, and a first transistor having base, collector and emitter electrodes and biased for class C operation; said input circuit including a first tuned circuit tuned to the frequency of said pilot carrier and means coupling said first tuned circuit to said base electrode of said first transistor to supply a signal at the frequency of said pilot carrier to said base electrode of said first transistor when a signal containing said pilot carrier is supplied to said first tuned circuit; said output circuit including a second tuned circuit tuned to the frequency of said switching voltage and means connecting said collector electrode of said first transistor to said second tuned circuit to supply collector current pulses from said collector electrode of said first transistor to said second tuned circuit; a second transistor having base, collector and emitter electrodes; means including a D.C. connection connecting said second tuned circuit and said base electrode of said second transistor to provide a variable D.C. bias for said second transistor which increases the collector current of said second transistor with increases in the collector current of said first transistor; and means providing a D.C. feedback path between said second and first transistors for varying the base-emitter D.C. bias of said first transistor to increase the collector current of said first transistor in response to increases in the collector curent of said second transistor, said means providing said D.C. feedback path comprising a first resistor connected in a circuit between said collector electrode of said second transistor and said base electrode of said first transistor, a second resistor connected in voltage divider relationship with said first resistor, a third resistor connected in a circuit between said emitter electrodes of said first and second transistors, and a fourth resistor connected in voltage divider relationship with said third resistor; D.C. power supply means and an indicator lamp, said D.C. power supply means being connected in a first series circuit also including said third and fourth resistors and in a second series circuit also including said first and second resistors, said collector and emitter electrodes of said second transistor and said indicator lamp, whereby when said second transistor is turned on sufficient current passes through said lamp to light said lamp.

6. The invention according to claim 5 wherein said indicator lamp is connected in voltage divider relationship with said third resistor and to said emitter electrode of said second transistor, said first series circuit also including said indicator lamp.

References Cited

UNITED STATES PATENTS

| | | | |
|---|---|---|---|
| 3,297,826 | 1/1967 | Dias et al. | 179—15 |
| 3,294,912 | 12/1966 | Merritt | 179—15 |
| 3,210,474 | 10/1965 | De Mong | 179—15 |

ROBERT L. GRIFFIN *Primary Examiner.*